United States Patent
Nakano et al.

(10) Patent No.: US 7,911,564 B2
(45) Date of Patent: Mar. 22, 2011

(54) POLARIZING PLATE, IMAGE DISPLAY, AND METHOD OF MANUFACTURING POLARIZING PLATE

(75) Inventors: Shinya Nakano, Ibaraki (JP); Naoto Ooe, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 383 days.

(21) Appl. No.: 12/294,539

(22) PCT Filed: Jun. 6, 2007

(86) PCT No.: PCT/JP2007/061437
§ 371 (c)(1),
(2), (4) Date: Sep. 25, 2008

(87) PCT Pub. No.: WO2007/145111
PCT Pub. Date: Dec. 21, 2007

(65) Prior Publication Data
US 2010/0238383 A1 Sep. 23, 2010

(30) Foreign Application Priority Data

Jun. 15, 2006 (JP) ................................. 2006-166124
Jun. 4, 2007 (JP) ................................. 2007-148536

(51) Int. Cl.
*G02F 1/1335* (2006.01)
*G02F 1/1333* (2006.01)
(52) U.S. Cl. ........................................ 349/96; 349/56
(58) Field of Classification Search ............. 349/96–103
See application file for complete search history.

(56) References Cited

U.S. PATENT DOCUMENTS

| 6,559,911 | B2 | 5/2003 | Arakawa et al. | |
| 6,787,289 | B2 | 9/2004 | Yamada et al. | |
| 7,342,619 | B2 | 3/2008 | Arakawa et al. | |
| 2003/0129385 | A1 | 7/2003 | Hojo et al. | |
| 2005/0083450 | A1* | 4/2005 | Motomura et al. | 349/96 |
| 2005/0099562 | A1 | 5/2005 | Nishikouji et al. | |
| 2006/0019100 | A1* | 1/2006 | Hatanaka et al. | 428/423.1 |

(Continued)

FOREIGN PATENT DOCUMENTS

JP 10-232313 A 9/1998

(Continued)

OTHER PUBLICATIONS

International Search Report of PCT/JP2007/061437, date of mailing Sep. 11, 2007.

*Primary Examiner* — Rhonda S Peace
(74) *Attorney, Agent, or Firm* — Westerman, Hattori, Daniels & Adrian, LLP

(57) ABSTRACT

A polarizing plate is provided that has high hardness, can have a reduced thickness, and has excellent in polarization properties. The polarizing plate includes a polarizer, an adhesive layer, and a cured resin layer. The adhesive layer is stacked on at least one surface of the polarizer. The cured resin layer is stacked on the surface of the adhesive layer located on the opposite side to the polarizer. The adhesive layer has a thickness in the range of 0.1 μm to 10 μm. The cured resin layer is formed of a solventless photocurable composition containing component (A) and component (B), with component (A) being at least one of a polyfunctional acrylic monomer and a polyfunctional methacrylic monomer and component (B) being a photocurable prepolymer.

16 Claims, 2 Drawing Sheets

U.S. PATENT DOCUMENTS

| | | | |
|---|---|---|---|
| 2007/0269616 A1* | 11/2007 | Nakano et al. | 428/1.31 |
| 2008/0100780 A1* | 5/2008 | Suzuki et al. | 349/96 |
| 2009/0082529 A1* | 3/2009 | Kageyama et al. | 526/66 |
| 2010/0209697 A1* | 8/2010 | Bowles et al. | 428/323 |

FOREIGN PATENT DOCUMENTS

| | | |
|---|---|---|
| JP | 2003-82043 A | 3/2003 |
| JP | 2003-185820 A | 7/2003 |
| JP | 2003-279744 A | 10/2003 |
| JP | 2004-70296 A | 3/2004 |
| JP | 2005-10329 A | 1/2005 |
| JP | 2005-219223 A | 8/2005 |
| JP | 2005-283849 A | 10/2005 |
| JP | 2005-338550 A | 12/2005 |
| JP | 2006-91656 A | 4/2006 |
| JP | 2006-126864 A | 5/2006 |

* cited by examiner

POLARIZING PLATE, IMAGE DISPLAY, AND METHOD OF MANUFACTURING POLARIZING PLATE

TECHNICAL FIELD

The present invention relates to polarizing plates, image displays and method of manufacturing polarizing plates.

BACKGROUND ART

A liquid crystal display (LCD) is one of the various image displays available. An LCD is a device that displays, for example, letters and images using electrooptic properties of liquid crystal molecules. Generally, an LCD is provided with a liquid crystal cell and two polarizing plates disposed on both sides of the liquid crystal cell. Generally, the polarizing plates each have a structure in which a protective film is attached to both sides of a polarizer with an adhesive. Conventionally, a triacetyl cellulose (TAC) film is widely used as the protective film. Furthermore, the polarizing plates may be subjected to a hard-coating (hardening) treatment. The hard-coating treatment is carried out by forming a hard-coating layer on the TAC film using a photocurable resin. Commonly, one of the TAC films provided on both sides of the polarizer is subjected to the hard-coating treatment (for instance, see Patent Document 1).

On the other hand, with increased applications of LCDs, for example, mobile devices such as cellular phones and car navigation units, there are demands for the polarizing plates to have an improved hardness. Furthermore, there also are demands for the polarizing plates to have a reduced thickness. In order to meet these demands, a polarizing plate has been proposed in which the TAC film is omitted and a protective layer is formed on the surface of a polarizer using a photopolymerizable compound (Patent Document 2).

[Patent Document 1] JP 2005-338550 A
[Patent Document 2] JP2005-10329A

DISCLOSURE OF THE INVENTION

With respect to the improvement in hardness, conventionally there has been no polarizing plate exhibiting a hardness of at least 6H in the pencil hardness test method described in JIS K 5400 (1990 version). Moreover, the polarizing plate wherein the TAC film is omitted and a protective film is formed on the surface of a polarizer using a photopolymerizable compound to reduce the thickness, has a problem with polarization properties.

Accordingly, the present invention is intended to provide a polarizing plate that has a high hardness, can have a reduced thickness, and has excellent polarization properties.

In order to achieve the above-mentioned object, a polarizing plate of the present invention includes a polarizer, an adhesive layer, and a cured resin layer,
 wherein the adhesive layer is stacked on at least one surface of the polarizer,
 the cured resin layer is stacked on the surface of the adhesive layer located on the opposite side to the polarizer,
 the adhesive layer has a thickness in the range of 0.1 µm to 10 µm, and
 the cured resin layer is formed of a solventless photocurable composition containing the following component (A) and component (B):
(A) at least one of a polyfunctional acrylic monomer and a polyfunctional methacrylic monomer, and
(B) a photocurable prepolymer.

An image display of the present invention includes a polarizing plate mounted thereon and is characterized in that the polarizing plate is a polarizing plate of the present invention.

The present inventors made a series of studies with respect to the deterioration in properties of conventional polarizing plates in which a protective layer was formed directly on a polarizer using a photopolymerization compound. As a result, it was found that the deterioration in properties resulted from erosion of a polarizer caused by a solvent used for forming the protective layer in the conventional polarizing plates. Based on this finding, it was further found that when a cured resin layer was stacked on at least one surface of a polarizer, with an adhesive layer having a thickness in the range of 0.1 µm to 10 µm being interposed therebetween, using the solventless photocurable composition having the aforementioned composition, the properties of the polarizer were not deteriorated and a cured resin layer with a higher hardness than that of conventional hard-coating layers was formed. Thus the present invention was completed. In the polarizing plate of the present invention, since the thickness of the adhesive layer is in the aforementioned range, it has excellent adhesiveness between the polarizer and the cured resin layer as well as a higher surface hardness. That is, the thickness of the adhesive layer in the aforementioned range makes it possible to prevent the polarizer and the cured resin layer from being separated from each other, to improve the hardness of the cured resin layer, and to prevent cracks from being generated at the cured resin layer surface. Moreover, the polarizing plate of the present invention can have a reduced thickness since the protective layer can be omitted.

BEST MODE FOR CARRYING OUT THE INVENTION

Figure 1:
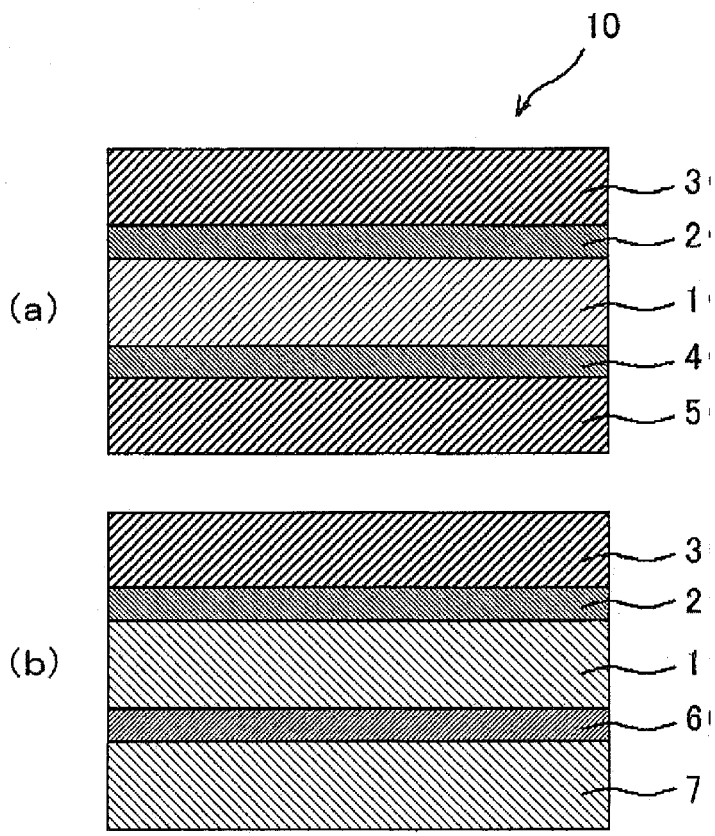
FIGS. 1(a) and (b) are sectional views showing examples of the structure of a polarizing plate according to the present invention.

In the polarizing plate of the present invention, it is preferable that the polarizer have a composite elastic modulus of at least 6 GPa.

In the polarizing plate of the present invention, it is preferable that the adhesive layer be a cured layer of a polyurethane resin composition.

In the polarizing plate of the present invention, the polyurethane resin composition may be a one-component moisture-curable polyurethane resin composition.

In the polarizing plate of the present invention, the polyurethane resin composition may be an aqueous polyurethane dispersion.

In the polarizing plate of the present invention, it is preferable that the cured resin layer have a thickness in the range of 10 µm to 30 µm.

In the polarizing plate of the present invention, it is preferable that the polyfunctional acrylic monomer or the polyfunctional methacrylic monomer, component (A), includes in its molecular structure at least four groups selected from an acryloyl group or methacryloyl group. In this case, the polyfunctional acrylic monomer and the polyfunctional meth acrylic monomer, component (A), are preferably monomers represented by the following general formula (I):

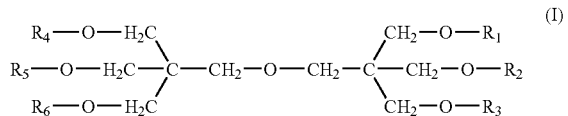

In the above-mentioned general formula (I), $R_1$, $R_2$, $R_3$, $R_4$, $R_5$, and $R_6$ each are selected from a hydrogen atom, an acryloyl group, and a methacryloyl group, and at least four of $R_1$, $R_2$, $R_3$, $R_4$, $R_5$, and $R_6$ are selected from an acryloyl group and a methacryloyl group.

In the polarizing plate of the present invention, it is preferable that the photocurable prepolymer, component (B), be at least one of polyurethane acrylate and polyurethane methacrylate.

In the polarizing plate of the present invention, it is preferable that the solventless photocurable composition include the following component (D):
(D) a reactive diluent.

In the polarizing plate of the present invention, it is preferable that the solventless photocurable composition include the following component (C):
(C) a photopolymerization initiator.

In the polarizing plate of the present invention, the photopolymerization initiator, component (C), is preferably an acetophenone initiator.

In the polarizing plate of the present invention, it is preferable that the polarizer contain iodine and polyvinyl alcohol resin.

In the polarizing plate of the present invention, it is preferable that the cured resin layer serves as both a hard-coating layer and a protective layer.

The method of manufacturing a polarizing plate of the present invention includes the following steps [1] to [6]:

[1] forming a coating film by coating at least one surface of a base material with a solventless photocurable composition containing component (A) and component (B), with component (A) being at least one of a polyfunctional acrylic monomer and a polyfunctional methacrylic monomer and component (B) being a photocurable prepolymer,

[2] irradiating the coating film with at least one of ultraviolet rays and electron rays, so that the coating film is cured to form a cured resin layer and thereby a first laminate (R1) is obtained,

[3] coating the surface of the cured resin layer of the first laminate (R1) with an adhesive composition to form an adhesive layer with a thickness in the range of 0.1 μm to 10 μm and thereby obtaining a second laminate (R2),

[4] providing a polarizer,

[5] stacking the polarizer and the second laminate (R2) together, with the adhesive layer of the second laminate (R2) being located on the polarizer side, to obtain a third laminate (R3), and

[6] separating the base material from the third laminate (R3).

Next, the present invention is described in detail using examples.

[A. Polarizing Plate of Present Invention]

As described above, a polarizing plate of the present invention includes a polarizer, an adhesive layer, and a cured resin layer. The adhesive layer is stacked on at least one surface of the polarizer. The cured resin layer is stacked on the surface of the adhesive layer located on the opposite side to the polarizer. That is, in the present invention, a cured resin layer is stacked on at least one surface of the polarizer, with an adhesive layer being interposed therebetween. In the present invention, the adhesive layer and the cured resin layer may be stacked on one surface of the polarizer or on both surfaces of the polarizer. In the present invention, the planar shape of the polarizing plate is, for instance, a rectangle. It can be a square or an oblong, but is preferably an oblong. Accordingly, in the present invention, the planar shapes of the respective components such as the polarizer, the adhesive layer, and the cured resin layer are preferably rectangles. They can be squares or oblongs, but are preferably oblongs to match with the planar shape of the polarizing plate. As described above, it is preferable that the cured resin layer serve as both a hard-coating layer and a protective layer. In this embodiment, the polarizing plate can have a reduced thickness.

For the reason of preventing the cured resin layer from cracking, as described above, the ratio $(d_1/d_2)$ between the thickness $(d_1)$ of the cured resin layer and the thickness $(d_2)$ of the polarizer is preferably in the range of 0.3 to 1.2, more preferably in the range of 0.4 to 1.0, and particularly preferably in the range of 0.5 to 0.8.

From the viewpoint of increasing the adhesion between the respective layers of the polarizing plate of the present invention and the hardness of the polarizing plate of the present invention, the ratio $(d_1/d_3)$ between the thickness $(d_1)$ of the cured resin layer and the thickness $(d_3)$ of the adhesiveness layer is preferably in the range of 2 to 40, more preferably in the range of 5 to 35, and further preferably in the range of 7 to 20.

In the polarizing plate of the present invention, the pencil hardness of the cured resin layer surface is preferably at least 6H, more preferably 7H to 9H, and further preferably 9H. The pencil hardness is a pencil scratch value that is measured according to JIS K 5400 (1990 version). Among conventional polarizing plates subjected to a hard-coating treatment, none had a hardness of 6H or higher. The reason is surmised as follows. That is, it is surmised that the reason why the hard-coating layers of conventional polarizing plates cannot have a high hardness of 6H or higher is because protective layers such as TAC films are disposed on both sides of a polarizer and cured resin layers are formed on the surfaces of the protective layers. On the other hand, it is surmised that in the polarizing plate of the present invention, since a cured resin layer is stacked on the surface of a polarizer using a solventless photocurable composition, with an adhesive layer with a thickness in the range of 0.1 μm to 10 μm being interposed therebetween, a high surface hardness, specifically a pencil hardness of at least 6H, can be obtained. As described above, the present inventors are the first to have found that a high hardness of at least 6H can be obtained when a cured resin layer is stacked on the surface of a polarizer, with an adhesive layer with a thickness in the range of 0.1 μm to 10 μm being interposed therebetween. It can be said that this is an excellent effect that cannot be anticipated by persons skilled in the art. The aforementioned surmises neither specify nor limit the present invention by no means.

The structure of an example of the polarizing plate according to the present invention is shown in the sectional view in FIG. 1(a). In FIG. 1(a), in order to make the structure of the polarizing plate of the present invention easily understandable, the sizes and ratios of the respective components are different from actual ones. The same applies to another structural diagram (FIG. 1(b)). As shown in FIG. 1(a), in the polarizing plate 10 of this example, a first adhesive layer 2 is stacked on one surface (the upper surface in FIG. 1(a)) of a polarizer 1. A first cured resin layer 3 is stacked on the surface (the upper surface in FIG. 1(a)) of the first adhesive layer 2 that is located on the opposite side to the polarizer 1. A second adhesive layer 4 is stacked on the other surface (the lower surface in FIG. 1(*a*)) of the polarizer 1. A second cured resin layer 5 is stacked on the surface (the lower surface in FIG. 1(*a*)) of the second adhesive layer 4 that is located on the opposite side to the polarizer 1. The first cured resin layer 3 and the second cured resin layer 5 may be identical to each other or may be different from each other. Similarly, the first adhesive layer 2 and the second adhesive layer 4 also may be identical to each other or may be different from each other. In the polarizing plate 10 of this example, the first cured resin layer 2 and the second cured resin layer 4 each serve as both a hard-coating layer and a protective layer. As a result, the polarizing plate 10 has a reduced thickness. In the present invention, the cured resin layers and the adhesive layers each may have a monolayer structure or a layered structure including at least two layers.

Another example of the polarizing plate according to the present invention is shown in the sectional view in FIG. 1(*b*). In FIG. 1(*b*), the identical parts to those shown in FIG. 1(*a*) are indicated with identical numerals. In a polarizing plate 10 of this example, an adhesive layer 2 is stacked on one surface (the upper surface in FIG. 1(*b*)) of a polarizer 1. A cured resin layer 3 is stacked on the surface (the upper surface in FIG. 1(*b*)) of the adhesive layer 2 that is located on the opposite side to the polarizer 1. An adhesive layer 6 is stacked on the other surface (the lower surface in FIG. 1(*b*)) of the polarizer 1. A protective layer 7 is stacked on the surface (the lower surface in FIG. 1(*b*)) of the adhesive layer 6 that is located on the opposite side to the polarizer 1. In the polarizing plate 10 of this example, the cured resin layer 2 serves as both a hard-coating layer and a protective layer. As a result, the polarizing plate 10 has a reduced thickness. A hard-coating layer may be stacked on the surface (the lower surface in FIG. 1(*b*)) of the protective layer 7 that is located on the opposite side to the adhesive layer 6. In the present invention, the adhesive layer and the protective layer may have a monolayer structure or a layered structure including at least two layers.

The polarizing plate of the present invention can have a pressure-sensitive adhesion layer for adhering to another member, on at least one surface thereof. In the polarizing plate of the present invention, the surface structure of the cured resin layer can be an uneven structure. When the surface of the cured resin layer has an uneven structure, it is provided with an antiglare function. In addition, in the polarizing plate of the present invention, an antireflection layer (a low-refractive-index layer) further can be formed on the surface of the cured resin layer.

The thickness of the polarizing plate of the present invention is, for example, in the range of 20 μm to 250 μm, preferably in the range of 40 μm to 200 μm, and more preferably in the range of 60 μm to 180 μm.

In the polarizing plate of the present invention, the transmittance (T) thereof is preferably in the range of 38% to 45%, while the polarization degree (P) thereof is preferably at least 98%. When the transmittance (T) and the polarization degree (P) are in the above-mentioned ranges, display images with higher contrast ratios in the direction perpendicular to the display surface can be obtained in a liquid crystal display including a polarizing plate of the present invention. The transmittance (T) is more preferably in the range of 39% to 44%, while the polarization degree (P) is more preferably at least 99%.

The polarization degree can be determined by measuring a parallel transmittance ($H_0$) and an orthogonal transmittance ($H_{90}$) and using the formula: polarization degree (%)={($H_0$−$H_{90}$)/($H_0$+$H_{90}$)}$^{1/2}$×100. The parallel transmittance ($H_0$) is a transmittance value of a parallel-type laminated polarizing plate produced with two identical polarizing plates stacked together in such a manner that their absorption axes are in parallel with each other. On the other hand, the orthogonal transmittance ($H_{90}$) is a transmittance value of an orthogonal-type laminated polarizing plate produced with two identical polarizing plates stacked together in such a manner that their absorption axes are orthogonal to each other. These transmittances are Y values that have been subjected to visibility correction under a visual field of 2 degrees (an illuminant C) according to JIS Z 8701 (1982 version).

In the polarizing plate of the present invention, the hue value a (the value a of the polarizing plate itself) is preferably at least −2.0, while the hue value b (the value b of the polarizing plate itself) is preferably 4.2 or lower. The ideal values of the above-mentioned hue values a and b are zero. When the hue values a and b are allowed to approximate to zero, a display image with more vivid colors can be obtained in a liquid crystal display in which a polarizing plate of the present invention is used.

[B. Polarizer]

The polarizer to be used in the present invention can be an arbitrary one selected suitably, as long as it allows the object of the present invention to be achieved. Examples of the polarizer include those obtained by allowing hydrophilic polymer films to absorb iodine and a dichromatic substance such as a dichromatic dye and then uniaxially drawing them, and polyene oriented films, such as a dehydrated polyvinyl alcohol film and a dehydrochlorinated polyvinyl chloride film. Examples of the hydrophilic polymer film include a polyvinyl alcohol film, a partially formalized polyvinyl alcohol film, and a partially saponified ethylene-vinyl acetate copolymer film. In the present invention, a polarizer obtained by allowing a polyvinyl alcohol film to absorb iodine is preferable.

The thickness of the polarizer is, for example, in the range of 5 μm to 50 μm, preferably in the range of 10 μm to 40 μm, and more preferably in the range of 20 μm to 40 μm.

The composite elastic modulus (Er) of the polarizer is preferably at least 6 GPa. When using a polarizer with a composite elastic modulus of at least 6 GPa, a polarizing plate with a higher hardness can be obtained. The composite elastic modulus (Er) is further preferably in the range of 8 GPa to 15 GPa, and particularly preferably in the range of 9 GPa to 14 GPa. The composite elastic modulus (Er) of the polarizer can be adjusted suitably by adjusting, for example, the moisture content and crosslinking density of the polarizer.

In the case of a polarizer obtained by allowing a polyvinyl alcohol film to absorb iodine, the iodine content is, for example, in the range of 2.0% by weight to 5.0% by weight, and preferably in the range of 2.0% by weight to 4.0% by weight when the optical properties are taken into consideration.

Preferably, the polarizer further contains at least one of potassium and boron. The potassium content in the polarizer is preferably in the range of 0.2% by weight to 1.0% by weight, and more preferably in the range of 0.3% by weight to 0.9% by weight. The boron content in the polarizer is preferably in the range of 0.5% by weight to 3.0% by weight, and more preferably in the range of 1.0% by weight to 2.8% by weight. When the polarizer contains potassium and boron, a polarizer (polarizing plate) can be obtained that has a suitable composite elastic modulus (Er) and a higher polarization degree. A polarizer containing at least one of potassium and boron can be produced by, for example, immersing a film, which is a polarizer-forming material, in a solution of at least one of potassium and boron. The solution also can serve as a solution containing iodine.

The polyvinyl alcohol resin can be obtained by saponifying a vinyl ester polymer that is obtained by polymerizing vinyl ester monomers, for example. The saponification degree of the polyvinyl alcohol resin is preferably in the range of 95 mol % to 99.9 mol % when the durability of the polarizer is taken into consideration. The saponification degree can be determined, for example, according to JIS K 6726 (1994 version).

The average polymerization degree of the polyvinyl alcohol resin can be selected suitably according to the intended use, but is preferably in the range of 1200 to 3600. The average polymerization degree can be determined, for example, according to JIS K 6726 (1994 version).

Preferably, the polyvinyl alcohol film contains at least one of a plasticizer and a surfactant. Examples of the plasticizer include polyalcohols such as ethylene glycol and glycerin. On the other hand, examples of the surfactant include a nonionic surfactant. The use of the polyalcohols and surfactant allows the polarizer to have further improved dyeing affinity and drawability.

For a method for obtaining the polyvinyl alcohol film, an arbitrary, suitable forming process can be employed. A conventionally known method can be used for the forming process.

A commercially available film also can be used as the polyvinyl alcohol film without further processing. Examples of the commercially available polyvinyl alcohol film include "Kuraray Vinylon Film" (trade name) manufactured by KURARAY CO., LTD., "TOHCELLO Vinylon Film" (trade name) manufactured by TOHCELLO CO., LTD., and "Nichigo Vinylon Film" (trade name) manufactured by THE NIPPON SYNTHETIC CHEMICAL INDUSTRY CO., LTD.

Figure 2:
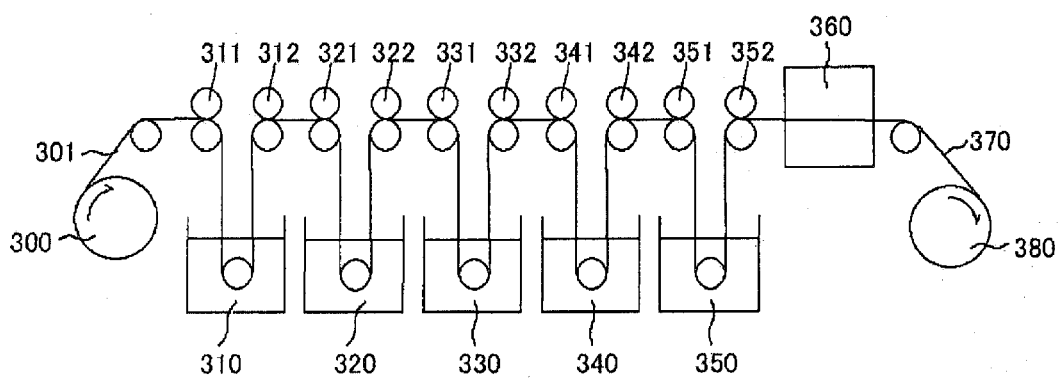
FIG. 2 is a schematic view showing an example of production of a polarizer.

An example of the method of producing a polarizer is described with reference to FIG. 2. As shown in FIG. 2, for instance, a polymer film (a stock film) 301 whose main component is polyvinyl alcohol resin is fed from a delivery part 300 and is immersed in a swelling bath 310 containing pure water and a dye bath 320 containing an iodine aqueous solution, and thereby the polymer film is subjected to a swelling treatment and a dyeing treatment while being tensioned in the longitudinal direction of the film with rolls 311, 312, 321, and 322 whose speed ratios are different from each other. Subsequently, the film that has been subjected to the swelling treatment and the dyeing treatment is immersed in a first crosslinking bath 330 containing potassium iodide and a second crosslinking bath 340, and thereby the film is subjected to a crosslinking treatment and a final drawing treatment while being tensioned in the longitudinal direction of the film with rolls 331, 332, 341, and 342 whose speed ratios are different from each other. The film that has been subjected to the crosslinking treatment is immersed in a washing bath 350 containing pure water with rolls 351 and 352 and thereby the washing treatment is carried out. The film that has been subjected to the washing treatment is dried with a drying means 360 to have a moisture percentage adjusted, for example, to 10% to 30%. Then it is wound up by a winding-up part 380. As described above, the polarizer 370 can be obtained by drawing the stock film so as to have a length that is, for instance, five to seven times the original length, in the series of steps mentioned above.

In order to improve the adhesiveness to the adhesive layer, the polarizer can be subjected to an arbitrary surface modification treatment. Examples of the surface modification treatment include a corona treatment, a plasma treatment, a glow discharge treatment, a flame treatment, an ozone treatment, a UV-ozone treatment, and an ultraviolet treatment. These treatments can be used individually or two or more of them can be used in combination.

[C. Adhesive Layer]

The adhesive layer of the present invention has a thickness in the range of 0.1 μm to 10 μm. With the adhesive layer having a thickness in the aforementioned range, a polarizing plate can be obtained that has excellent adhesion between the polarizer and the cured resin layer and a higher surface hardness. When the thickness is in the aforementioned range, the adhesive layer may have a monolayer structure or a layered structure including at least two layers, as described above. The thickness of the adhesive layer is preferably in the range of 0.1 μm to 8 μm, more preferably in the range of 0.5 μm to 6 μm, and further preferably in the range of 1 μm to 5 μm.

The composite elastic modulus (Er) of the adhesive layer is preferably at least 0.05 GPa, more preferably in the range of 0.05 GPa to 0.5 GPa, and further preferably in the range of 0.1 GPa to 0.3 GPa.

The adhesive layer can be obtained by curing an adhesive composition, for example. Preferably, the adhesive composition is a polyurethane resin composition, and the adhesive layer is a cured layer of the polyurethane resin composition. The polyurethane resin composition may be of one-component type, which is cured by itself, or may be of two-component type, which is cured with a curing agent further added to the polyurethane resin composition.

The polyurethane resin composition may be a moisture-curable polyurethane resin composition. In the present invention, the "moisture-curable polyurethane resin composition" denotes a resin composition that contains, as its main component, a urethane polymer having an isocyanate group (—N=C=O) at the molecular end thereof and is cured by reacting with water contents (moisture) contained in at least one of the air and base material. The adhesive layer containing the moisture-curable polyurethane resin composition used therein exhibits good adhesion with respect to the polarizer surface and the cured resin layer surface. Accordingly, when the moisture-curable polyurethane resin composition is used for the adhesive layer, the polarizer and the cured resin layer can be prevented more suitably from being separated from each other.

Preferably, the moisture-curable polyurethane resin composition is of one-component type. The moisture-curable polyurethane resin composition contains at least a polyurethane resin (U1), and contains preferably a polyurethane resin (U1) and a solvent. The polyurethane resin (U1) can be obtained by reacting, for example, polyol (a) having a hydroxyl group at the molecular end thereof with polyisocyanate (b) having an isocyanate group at the molecular end thereof. The weight average molecular weight (Mw) of the polyurethane resin (U1) is preferably at least 2000, and more preferably in the range of 2000 to 15000.

The moisture-curable polyurethane resin composition may contain arbitrary additives such as water, a solvent, a tackifier, an antistatic agent, a leveling agent, a silane coupling agent, and an antioxidant, according to the intended use. The amount of the additives to be mixed is preferably 1 part by weight to 10 parts by weight with respect to 100 parts by weight of the total solid content of the moisture-curable polyurethane resin composition. The concentration of the total solid content of the moisture-curable polyurethane resin composition is, for example, a heating residue determined according to JIS K 5407. The concentration of the total solid content of the moisture-curable polyurethane resin composition is preferably in the range of 10% by weight to 80% by weight.

Examples of the polyol (a) include polyester polyol, polyether polyol, polyether polyester polyol, polyester amide polyol, acrylic polyol, polycarbonate polyol, polyhydroxylkane, and polyurethane polyol. These may be used individually or two or more may be used in combination.

Examples of polyisocyanate (b) include 2,4-tolylene diisocyanate, 2,6-tolylene diisocyanate, 4,4'-diphenyl methane isocyanate, 2,4'-diphenyl methane diisocyanate, 1,4-phenylene diisocyanate, 1,5-naphthalene diisocyanate, ethylene diisocyanate, propylene diisocyanate, tetramethylene diisocyanate, hexamethylene diisocyanate, isophorone diisocyanate, and xylylene diisocyanate. These may be used individually or two or more of them may be used in combination.

The polyurethane resin (U1) includes preferably at least a burette group in the molecular structure thereof and more preferably at least a hexamethylene diisocyanate-biuret group in the molecular structure thereof. The polyurethane resin (U1) including at least the hexamethylene diisocyanate-biuret group can be obtained by, for example, a method in which after a part of hexamethylene diisocyanate is modified with polyamine or water, it is allowed to undergo a reaction in the presence of a biuretization catalyst and a catalyst poison is added thereto when a predetermined reaction rate was achieved, so that the reaction is stopped.

The polyurethane resin composition may be an aqueous polyurethane resin composition. In the present invention, the "aqueous polyurethane resin composition" denotes a resin composition with fine particles of urethane polymer being floated and dispersed in water. The adhesive layer formed using the aqueous polyurethane resin composition exhibits good adhesion with respect to the polarizer surface and the cured resin surface. Accordingly, the use of the aqueous polyurethane resin composition for the adhesive layer makes it possible to prevent more suitably the polarizer and the cured resin layer from being separated from each other.

The aqueous polyurethane resin composition is preferably of a two-component type to be used together with a curing agent. The aqueous polyurethane resin composition contains at least water and a polyurethane resin (U2). The polyurethane resin (U2) can be obtained by, for example, reacting polyol (a) having a hydroxyl group at the molecular end thereof, polyisocyanate (b) having an isocyanate group at the molecular end thereof, and a compound (c) having an active hydrogen group and a hydrophilic group in the molecular structure thereof. The weight average molecular weight (Mw) of the polyurethane resin (U2) is preferably at least 3000, and more preferably in the range of 3000 to 20000.

The aqueous polyurethane resin composition may contain arbitrary additives such as an emulsifier, a surfactant, a tackifier, an antistatic agent, a leveling agent, a silane coupling agent, and an antioxidant, according to the intended use. The concentration of the total solid content of the aqueous polyurethane resin composition is, for example, a heating residue determined according to JIS K 5407. The concentration of the total solid content of the aqueous polyurethane resin composition is preferably in the range of 10% by weight to 80% by weight.

Any suitable compound can be selected as the compound (c), as long as it has an active hydrogen group and a hydrophilic group in the molecular structure thereof. The active hydrogen group is one that reacts with an isocyanate group. Examples thereof include an amino group, a hydroxyl group, and a mercapto group. The hydrophilic group is, for example, an anionic group such as a carboxyl group, a sulfonic acid group, a phosphate group, a sulfonate group, an epoxy group, or a polyoxyalkylene group. Examples of the compound (c) include 2-oxyethanesulfonic acid, phenolsulfonic acid, sulfobenzoic acid, 5-sulfoisophthalic acid, 2,2-dimethylollactic acid, 2,2-dimethylolacetic acid, dimethylolbutanoic acid, diaminobutanesulfonic acid, and 2,3-dihydroxypropylphenylphosphate. These may be used individually or two or more of them may be used in combination.

When the aqueous polyurethane resin composition is of a two-component type, which is used together with a curing agent, the curing agent can be any suitable one selected according to the intended use. Examples of the curing agent include an isocyanate curing agent, an epoxy curing agent, a melamine curing agent, a carbodiimide curing agent, an oxazoline curing agent, and an aziridine curing agent. The amount of the curing agent to be mixed is preferably in the range of 1 part by weight to 30 parts by weight with respect to 100 parts by weight of the polyurethane resin (U2) described above.

The polyurethane resin composition may be an aqueous polyurethane dispersion containing a polyurethane resin composition dispersed in water. The aqueous polyurethane dispersion may be an externally emulsified one in which a polyurethane resin composition is dispersed in water using an external emulsifier or a self-emulsified one in which a polyurethane resin composition that has been polymerized and has been made into an aqueous type is dispersed in water. Preferably, the aqueous polyurethane dispersion is a self-emulsified one. The adhesive layer formed using the aqueous polyurethane dispersion exhibits good adhesion with respect to the polarizer surface and the cured resin surface. Accordingly, the use of the aqueous polyurethane dispersion for the adhesive layer makes it possible to more suitably prevent the polarizer and the cured resin layer from being separated from each other.

The process of synthesizing the polyurethane dispersion is not particularly limited. Examples thereof include a solution process, a prepolymer-ionomer mixing process, a hot-melt process, and a ketimine-ketazine process.

[D. Cured Resin Layer]

The cured resin layer of the present invention is formed of a photocurable composition containing the aforementioned component (A) and component (B). In the present invention, the polyfunctional acrylic monomer or the polyfunctional methacrylic monomer, component (A) described above, is an acrylic monomer or a methacrylic monomer that has at least two acryloyl groups or methacryloyl groups in its molecular structure. In the present invention, the photocurable prepolymer, component (B) described above, is a polymer that has a photoreactive functional group in its molecular structure and at least two repeating structural units. The number of the repeating structural units is, for example, in the range of 2 to 20.

The cured resin layer can contain unreacted components, which are component (A) and component (B) that have remained without reacting, or can contain no unreacted components. However, in order to obtain a higher surface hardness, preferably, less unreacted components are contained in the cured resin layer, and ideally, no unreacted components are contained therein.

In terms of the hardness, the thicker the cured resin layer, the higher the hardness. However, when being excessively thick, the cured resin layer may crack. From the viewpoints of high hardness and crack prevention, it is preferable that the thickness of the cured resin layer be set suitably. The thickness of the cured resin layer is preferably in the range of 10 μm to 40 μm, more preferably in the range of 14 μm to 38 μm, and further preferably in the range of 18 μm to 36 μm.

With respect to the cured resin layer, the composite elastic modulus (Er) thereof is preferably at least 4 GPa and the hardness (H) thereof is preferably at least 400 MPa. When the composite elastic modulus (Er) and the hardness (H) are in the above-mentioned ranges, a cured resin layer can be formed with a higher value of scratch hardness such as pencil hardness. The composite elastic modulus (Er) is more preferably in the range of 4 GPa to 8 GPa and further preferably in the range of 5 GPa to 7 GPa. The hardness (H) is more preferably in the range of 400 MPa to 800 MPa and further preferably in the range of 500 MPa to 700 MPa.

The photocurable composition to be used in the present invention is of a solventless type that contains no solvent. In the case of using a solventless photocurable composition, since no solvent is contained, the polarizer to which it is applied is not deteriorated and a material with a lower solvent resistance also can be used as a material for the polarizer. Furthermore, when the cured resin layer is to be formed, a step of drying a solvent is not required, and various problems (for instance, whitening, cracks, and insufficient curing) that are caused by the solvent do not occur. Furthermore, since no solvent volatilizes in the atmosphere in forming the cured resin layer, no environmental pollution or health problem of operators caused by a solvent occurs.

The polyfunctional acrylic monomer or methacrylic monomer, component (A), is used in the present invention to improve the crosslinking density of the cured resin layer. The polyfunctional acrylic monomer or methacrylic monomer is preferably one having 4 to 6 acryloyl groups or methacryloyl groups in its molecular structure and more preferably an acrylic monomer or methacrylic monomer represented by general formula (I) described above. A preferred example of general formula (I) is one represented by general formula (II) below.

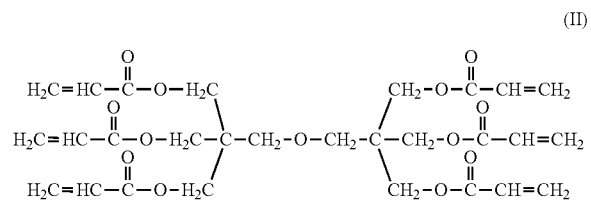

(II)

The weight average molecular weight (Mw) of the polyfunctional acrylic monomer or methacrylic monomer is preferably in the range of 250 to 800. When the weight average molecular weight (Mw) is in the aforementioned range, a cured resin layer that has a high surface hardness and that undergoes less contraction due to curing can be obtained. The weight average molecular weight (Mw) is preferably in the range of 320 to 700 and more preferably in the range of 400 to 650.

With respect to the aforementioned component (A), examples of the polyfunctional acrylic monomer other than those described above include dipentaerythritol hexaacrylate, dipentaerythritol pentaacrylate, ditrimethylolpropane tetraacrylate, and tris(acryloxyethyl)isocyanurate. Furthermore, with respect to component (A), examples of the polyfunctional methacrylic monomer other than those described above include dipentaerythritol hexamethacrylate, dipentaerythritol pentamethacrylate, ditrimethylolpropane tetramethacrylate, and tris(methacryloxyethyl)isocyanurate. With respect to these polyfunctional acrylic monomers or methacrylic monomers, one of them can be used individually, or two or more of them can be used in combination.

The polyfunctional acrylic monomer or methacrylic monomer to be used can be a commercialized product. One of the commercialized products can be used individually, or two or more of them can be used in combination. Examples of the polyfunctional acrylic monomer or methacrylic monomer that is a commercialized product include "ARONIX" (trade name) series and "ARONOXETANE" (trade name) series manufactured by TOAGOSEI CO., LTD., and "KAYARAD" (trade name) series manufactured by NIPPON KAYAKU CO., LTD.

In the present invention, the photocurable prepolymer (also referred to as a "photocurable oligomer"), component (B) described above, is used mainly for improving the physical property of the cured resin layer. The use of components (A) and (B) in combination allows the cured resin layer to be provided with suitable flexibility and thereby a cured resin layer that has a higher surface hardness and is excellent in adhesiveness to, for example, a polarizer, can be obtained.

The photocurable prepolymer is not particularly limited. Examples thereof include polyester acrylate, polyester methacrylate, epoxy acrylate, epoxy methacrylate, polyurethane acrylate, and polyurethane methacrylate. One of these prepolymers can be used individually, or two or more of them can be used in combination. Among these prepolymers, polyurethane acrylate and polyurethane methacrylate are preferable. Since polyurethane acrylate and polyurethane methacrylate have large molecular weights, the use thereof makes it possible to reduce the crosslinking density per unit volume of the cured resin layer and to further prevent the cured resin layer from contracting due to curing. As a result, cracks or warping of the polarizing plate that are caused by the contraction due to curing can be further reduced.

In view of improving the surface hardness of the cured resin layer and preventing it from contracting due to curing, the weight average molecular weight (Mw) of the photocurable prepolymer is preferably in the range of 250 to 5000, more preferably in the range of 300 to 4000, and further preferably in the range of 400 to 3000.

The polyurethane acrylate or polyurethane methacrylate has a urethane bond (—NHCO—) and at least one of an acryloyl group and a methacryloyl group in its molecular structure. The polyurethane acrylate and polyurethane methacrylate can be synthesized, for example, by the following method (a) or (b):

(a) allowing the following to react together: polyisocyanate having at least two isocyanate groups, polyol having at least two hydroxyl groups, and at least one of hydroxy acrylate having at least one hydroxyl group and hydroxy methacrylate having at least one hydroxyl group; or (b) allowing the following to react with each other: polyisocyanate having at least two isocyanate groups, and at least one of hydroxy acrylate having at least two hydroxyl groups and hydroxy methacrylate having at least two hydroxyl groups.

Examples of polyisocyanate include tetramethylene diisocyanate, hexamethylene diisocyanate, isophorone diisocyanate, 2,4-tolylene diisocyanate, 4,4'-diphenyl diisocyanate, 1,5-naphthalene diisocyanate, and xylene diisocyanate. Examples of polyol include 1,3-butanediol, 1,4-butanediol, trimethylol ethane, trimethylol propane, ditrimethylol ethane, dipentaerythritol, and diglycerol. Examples of hydroxy acrylate include 2-hydroxyethyl acrylate, 4-hydroxycyclohexyl acrylate, 5-hydroxycyclooctyl acrylate, and pentaerythritol triacrylate. Examples of hydroxy methacrylate include 2-hydroxyethyl methacrylate, 4-hydroxycyclohexyl methacrylate, 5-hydroxycyclooctyl methacrylate, and pentaerythritol trimethacrylate.

The polyurethane acrylate and polyurethane methacrylate to be used herein can be commercialized products. One of the commercialized products can be used individually, or two or more of them can be used in combination. Examples of commercially available polyurethane acrylate or polyurethane methacrylate include "SHIKOH" (trade name) series manufactured by THE NIPPON SYNTHETIC CHEMICAL INDUSTRY CO., LTD., and aliphatic urethane acrylate manufactured by DAICEL-CYTEC COMPANY LTD.

From the viewpoints of, for example, the surface hardness and adhesiveness of the cured resin layer, the mass ratio (A:B) of component (A) and component (B) is, for instance, in the range of 98:2 to 50:50, and preferably in the range of 98:2 to 60:40 (where A+B=100).

Preferably, the photocurable composition further contains a reactive diluent, component (D) mentioned above. The use of the reactive diluent allows the viscosity of the photocurable composition to be adjusted in the range that is suitable for application thereof and thereby the cured resin layer with excellent surface uniformity can be obtained.

Monomers with a small number of functional groups, specifically 1 to 3 functional groups, are used for the reactive diluent. Examples of the monomers with a small number of functional groups include trimethylolpropane triacrylate, trimethylolpropane trimethacrylate, 1,3-butanediol diacrylate, 1,3-butanediol dimethacrylate, 1,4-butanediol diacrylate, 1,4-butanediol dimethacrylate, 1,6-hexanediol diacrylate, 1,6-hexanediol dimethacrylate, diethylene glycol diacrylate, diethylene glycol dimethacrylate, neopentyl glycol diacrylate, neopentyl glycol dimethacrylate, 2-ethylhexyl acrylate, 2-ethylhexyl methacrylate, 2-hydroxyethyl acrylate, 2-hydroxyethyl methacrylate, 2-hydroxypropyl acrylate, 2-hydroxypropyl methacrylate, tetrahydrofurfuryl acrylate, tetrahydrofurfuryl methacrylate, acryloyl morpholine, and methacryloyl morpholine. One of these reactive diluents can be used individually, or two or more of them can be used in combination.

From the viewpoints of the viscosity of the photocurable composition and the surface hardness of the cured resin layer, the mass ratio (A+B:D) between the sum (A+B) of components (A) and (B) and component (D) is, for example, in the range of 95:5 to 60:40 and preferably in the range of 90:10 to 70:30 (where A+B+D=100).

Preferably, the photocurable composition further contains a photopolymerization initiator, component (C) described above. The photopolymerization initiator is used preferably when the cured resin layer is cured with ultraviolet rays, while it can be omitted when the cured resin layer is cured with electron rays.

The photopolymerization initiator is not particularly limited. Examples thereof include an acetophenone initiator, a benzoin ether initiator, a benzophenone initiator, and a thioxanthone initiator. From the viewpoints of, for example, color protection and curing rate at the time of curing, the photopolymerization initiator is preferably an acetophenone initiator. Examples of the acetophenone initiator include diethoxyacetophenone, benzil dimethyl ketal, 1-hydroxy cyclohexyl phenyl ketone, 2-hydroxy-2-methyl-1-phenyl propane-1-one, 2-methyl-2-morpholino(4-thiomethylphenyl)propane-1-one, 4-(2-hydroxyethoxy)phenyl-(2-hydroxy-2-propyl)ketone, and 1-phenyl-1,2-propanedione-2-(o-ethoxycarbonyl) oxime. One of these photopolymerization initiators can be used individually, or two or more of them can be used in combination.

The photopolymerization initiator to be used may be a commercially available product. The commercially available product alone may be used individually or two or more of those may be used in combination. Examples of the commercially available photopolymerization initiator include "IRGACURE" (trade name) series manufactured by CIBA SPECIALTY CHEMICALS. Furthermore, commercialized various products of TOKYO CHEMICAL INDUSTRY CO., LTD. also can be used for the photopolymerization initiator.

When component (D) is not used for the photocurable composition, the amount of the photopolymerization initiator is preferably 1 to 10 parts by weight and more preferably 2 to 8 parts by weight, with respect to 100 parts by weight of the sum (A+B) of components (A) and (B). On the other hand, when component (D) is used, the amount of the photopolymerization initiator is preferably 1 to 10 parts by weight and more preferably 2 to 8 parts by weight, with respect to 100 parts by weight of the sum (A+B+D) of components (A), (B), and (D).

The photocurable composition can contain suitable arbitrary additives. Examples of the additives include a leveling agent, a delusterant, a sensitizer, an antistatic agent, an antioxidant, a thermal polymerization inhibitor, a tackifier, a plasticizer, and a nonreactive polymer. The amount of the additives to be used is preferably in the range of larger than zero but not larger than 5 parts by weight with respect to 100 parts by weight of the sum (A+B) of components (A) and (B).

Next, a method of manufacturing a polarizing plate of the present invention is described using an example. However, the polarizing plate of the present invention may be manufactured by methods other than that employed in the following example.

The method of manufacturing a polarizing plate of this example includes the following steps [1] to [6]:

[1] forming a coating film by coating at least one surface of a base material with a solventless photocurable composition containing components (A) and (B), with component (A) being at least one of a polyfunctional acrylic monomer and a polyfunctional methacrylic monomer, and component (B) being a photocurable prepolymer,

[2] irradiating the coating film with at least one of ultraviolet rays and electron rays, so that the coating film is cured to form a cured resin layer and thereby a first laminate (R1) is obtained,

[3] coating the surface of the cured resin layer of the first laminate (R1) with an adhesive composition to form an adhesive layer with a thickness in the range of 0.1 μm to 10 μm and thereby obtaining a second laminate (R2),

[4] providing a polarizer,

[5] stacking the polarizer and the second laminate (R2) together, with the adhesive layer of the second laminate (R2) being located on the polarizer side, to obtaining a third laminate (R3), and

[6] separating the base material from the third laminate (R3).

Figure 3:
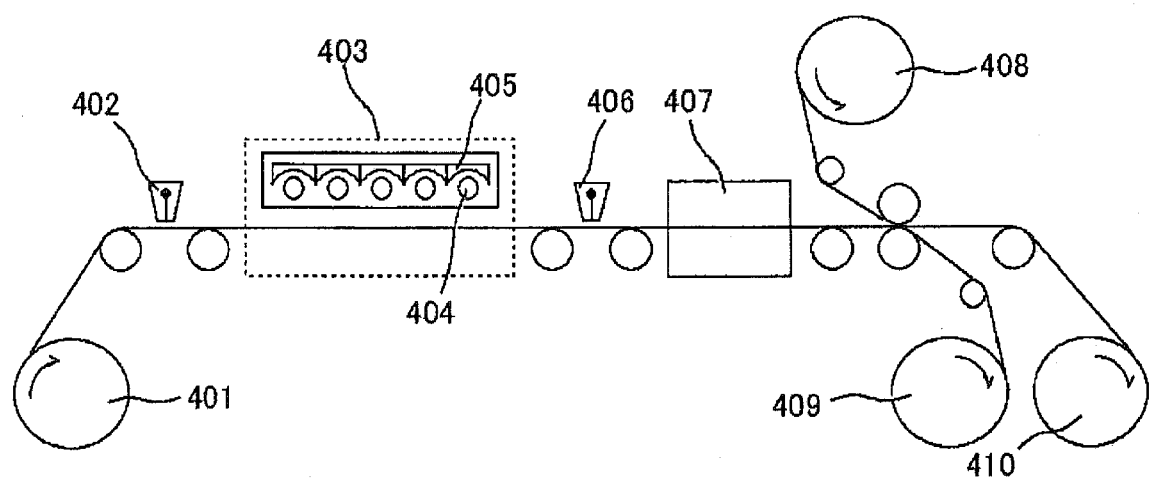
FIG. 3 is a schematic view showing an example of production of a polarizing plate according to the present invention.

An example of the method of manufacturing a polarizing plate is described with reference to FIG. 3. As shown in FIG. 3, a base material is fed from a first feeding part 401, and the surface of the base material is then coated with a solventless photocurable composition with a first coater 402, so that a coating film is formed (step [1]). Subsequently, the base material with the coating film formed thereon is sent to an ultraviolet irradiation means 403 provided with light sources 404 and irradiators 405, and the coating film is irradiated with ultraviolet rays there to form a cured resin layer on the surface of the base material. Thus, the first laminate (R1) is produced (step [2]). Next, the surface of the cured resin layer of the first laminate (R1) is coated with an adhesive composition with a second coater 406. Thereafter, it was dried with a drying means 407 to form an adhesive layer. Thus, a second laminate (R2) is produced (step [3]). Subsequently, a polarizer prepared separately is fed from a second feeding part 408 (step [4]). The polarizer and the second laminate (R2) are stacked together, with the adhesive layer of the second laminate (R2) being located on the polarizer side, and thus a third laminate (R3) is produced (step [5]). Then the base material is separated from the third laminate (R3) (step [6]) and is taken up by a first take-up part 409. On the other hand, the polarizing plate obtained by separating the base material from the third laminate (R3) is taken up by a second take-up part 410.

In this example, an example of manufacturing a polarizing plate is described, with the polarizing plate including a cured resin layer stacked on one surface of the polarizer. The polarizing plate with a structure shown in FIG. 1(a) in which the cured resin layer is formed on both the surfaces of the polarizer, can be manufactured by, for example, repeating the process twice. That is, a polarizing plate with the structure shown in FIG. 1(a) can be obtained by feeding the polarizing plate obtained by the aforementioned process from the second feeding part 408, so that the second laminate is stacked on the polarizer side of the polarizing plate. Furthermore, the polarizing plate with the structure shown in FIG. 1(b) can be manufactured by, for example, stacking a protective layer on the surface of the polarizing plate obtained by the aforementioned process that is located on the opposite side to the side on which the cured resin layer has been stacked, with an arbitrary adhesive layer being interposed therebetween. Furthermore, in manufacture of the polarizing plate according to the present invention, an electron irradiation means may be used instead of the ultraviolet irradiation means.

According to the method described above, the coating film is cured on the base material. Therefore a selection of a base material that does not cause creases or waving even when the coating film is cured and shrunk makes it possible to form a cured resin layer with excellent surface homogeneity. Moreover, according to the aforementioned method, the cured resin layer is transferred from the base material to the polarizer. Accordingly, the cured resin layer can be stacked so that the surface of the cured resin that has been cured in contact with the surface of the base material (that is, without being subjected to oxygen inhibition) faces the outside of the polarizing plate. As a result, a polarizing plate can be obtained that exhibits a higher surface hardness.

An example of the method of coating with the solventless photocurable composition and the adhesive composition is a coating method employing a coater. Examples of the coater include a reverse roll coater, a forward roll coater, a gravure coater, a knife coater, a rod coater, a slot die coater, a slot orifice coater, a curtain coater, a fountain coater, an air doctor coater, a kiss coater, a dip coater, a bead coater, a blade coater, a cast coater, a spray coater, a spin coater, an extrusion coater, and a hot melt coater. Preferred coaters are a reverse roll coater, a forward roll coater, a gravure coater, a rod coater, a slot die coater, a slot orifice coater, a curtain coater, and a fountain coater. Preferably, the coater employs a coater head with a closed applicator to prevent the concentration of the coating solution from changing. Coating methods using the aforementioned coaters are preferable because they make it possible to obtain cured resin layers with less variation in thickness.

Examples of the base material include a metal belt, a glass sheet, a polyethylene terephthalate film, a polycarbonate film, a triacetylcellulose film, a norbornene film, a polyester film, and a polystyrene film. The surface of the base material to be coated with the solventless photocurable composition may have been subjected to, for example, a separation treatment.

The ultraviolet irradiation means includes, for example, a light source, an irradiator, a cooling apparatus, and a power supply unit. Examples of the light source include a high-pressure mercury lamp, an ozoneless mercury lamp, a xenon lamp, a fusion lamp, and a metal halide lamp. With considerations given to, for example, the curing time and the ultraviolet penetration depth, the wavelength of the light source can be selected suitably. The wavelength of the light source is, for example, in the range of 100 nm to 400 nm and preferably in the range of 210 nm to 380 nm. The cumulative quantity of irradiation light is preferably in the range of 50 mJ/cm$^2$ to 1000 mJ/cm$^2$.

Preferably, the irradiators each are provided with a filter (for instance, a heat ray cut filter) for cutting wavelengths of infrared rays and visible rays to reduce the thermal damage to the polarizer. The cooling apparatus and the power supply unit are used to keep the temperature of the whole light sources and irradiators constant and to allow the light sources to be lighted stably. Examples of the cooling apparatus include those of an air cooling (exhaust air or blow/exhaust air) type or a water cooling type.

Examples of the electron irradiation means include various electron irradiation means of a scanning type, an area beam type, and a self-shielding type. Preferably, the electron irradiation means includes an irradiation tube, an irradiation head, and a power supply. The output power of the electron irradiation means is, for example, in the range of 50 kV to 1000 kV.

[E. Protective Layer]

In the present invention, the "protective layer" is formed separately from the cured resin layer, is formed on the opposite side to the side of the polarizer on which the cured resin layer has been formed, with an arbitrary adhesive layer being interposed therebetween as shown in FIG. 1(b), and is an arbitrary component. The material to be used for forming the protective layer is preferably a cellulose resin such as TAC or norbornene resins from the viewpoints of, for example, polarization properties and durability. Examples of commercially available films formed of these resins include "FUJITAC" (trade name) manufactured by FUJI PHOTO FILM CO., LTD., "ZEONOR" (trade name) manufactured by NIPPON ZEON CO. LTD., and "ARTON" (trade name) manufactured by JSR CORPORATION.

The thickness of the protective film can be determined suitably. From the viewpoints of, for instance, strength, workability such as handling properties, and reduction in thickness, the thickness is, for example, in the range of 1 μm to 500 μm, preferably in the range of 5 μm to 200 μm, and more preferably in the range of 10 μm to 150 μm. With respect to the phase difference value of the protective layer, the phase difference value (Re) in the film plane is preferably in the range of 0 nm to 5 nm, more preferably in the range of 0 nm to 3 nm, and further preferably in the range of 0 nm to 1 nm, while the phase difference value (Rth) in the thickness direction is preferably in the range of 0 nm to 15 nm, more preferably in the range of 0 nm to 12 nm, further preferably in the range of 0 nm to 5 nm, and most preferably in the range of 0 nm to 3 nm.

The adhesive to be used for the adhesive layer can be, for example, an adhesive made of an acrylic polymer or a vinyl alcohol polymer. From the viewpoint of adhesion with respect to the polarizer, the adhesive is preferably one made of a vinyl alcohol polymer. The adhesive can contain a water-soluble crosslinking agent of a vinyl alcohol polymer such as boric acid, borax, glutaraldehyde, melamine, or oxalic acid.

When a polymer film containing a norbornene resin is used as the protective film, the adhesive to be used herein is preferably one that is excellent in transparency, has a low refractive index, and can exhibit sufficiently high adhesive strength even when it is formed as a thin layer. Examples of such an adhesive include a dry lamination adhesive in which a polyurethane resin solution and a polyisocyanate resin solution are mixed together, a styrene-butadiene rubber adhesive, and a two-part epoxy curable adhesive (for instance, one made of two parts of epoxy resin and polythiol, one made of two parts of epoxy resin and polyamide). A solvent adhesive, such as a two-part epoxy curable adhesive, is particularly preferable. In some of the adhesives, adhesive strength can be improved by using a suitable primer for adhesion. In the case of using such adhesives, it is preferable that the primer for adhesion be used.

[F. Stacking Polarizing Plate no Liquid Crystal Cell]

As described above, when the polarizing plate of the present invention is stacked on a liquid crystal cell, it is preferable that a pressure-sensitive adhesive layer be provided on the surface of the polarizing plate, for example. This makes it easy to stack the polarizing plate of the present invention on the liquid crystal cell.

The pressure-sensitive adhesive is not particularly limited, but can be selected suitably from those containing, as a base polymer, acrylic polymer, silicone polymer, polyester, polyurethane, polyamide, polyvinyl ether, vinyl acetate/vinyl chloride copolymer, modified polyolefin, epoxy polymer, fluorinated polymer, or rubber polymer, such as natural rubber and synthetic rubber. Particularly, an acrylic pressure-sensitive adhesive is preferable because it has excellent optical transparency, exhibits an appropriate wettability, cohesiveness, and adhesiveness, and is excellent in weather resistance and heat resistance.

[G. Applications]

The polarizing plate of the present invention can be used suitably for various image displays such as liquid crystal displays (LCDs) and EL displays (ELDs). A liquid crystal display of the present invention has the same configuration as that of conventional liquid crystal displays except that a polarizing plate of the present invention is used. The liquid crystal display of the present invention can be produced, for example, by assembling respective components such as a liquid crystal cell, optical members such as a polarizing plate of the present invention, and a lighting system (for instance, a backlight) according to need, and incorporating a drive circuit.

In the present invention, the configuration of the liquid crystal display is not particularly limited. Examples of the liquid crystal display include one in which an optical member such as a polarizing plate of the present invention is disposed on one or both sides of a liquid crystal cell and one in which a backlight or a reflector is used in a lighting system. When optical members such as polarizing plates of the present invention are placed on both sides of a liquid crystal cell, they can be identical to each other or can be different from each other. Furthermore, optical components and optical members such as a diffusion plate, an antiglare layer, an antireflection layer, a protective plate, a prism array, and a lens array sheet can be disposed in the liquid crystal display of the present invention.

The image display of the present invention is used for suitable arbitrary applications. Examples of the applications include: business machines such as desktop personal computers, notebook personal computers, and copying machines; portable devices such as mobile phones, watches, digital cameras, personal digital assistants (PDAs), and portable game devices; home electrical equipment such as video cameras, television sets, and microwave ovens; vehicle equipment such as back monitors, monitors for car navigation systems, and car audio systems; display equipment such as monitors for commercial store information; security equipment such as surveillance monitors; and nursing care and medical equipment such as monitors for nursing care and monitors for medical treatments.

EXAMPLES

Next, examples of the present invention are described together with a comparative example. The present invention is not specified or limited by the examples and the comparative example. The respective analytical methods employed in the examples and the comparative example are as follows.

(1) Thickness Measurement Method:

When the thickness was less than 10 μm, the thickness of a section was measured using FE-SEM ["S-4000" (product name) (accelerating voltage: 3 kV) manufactured by Hitachi, Ltd.]. When the thickness was 10 μm or more, it was measured using a digital micrometer "KC-351C" manufactured by Anritsu Corporation. The samples used for measuring the thickness of the sections thereof were produced by cutting out a small piece of the polarizing plate with an ultramicrotome.

(2) Method of Measuring Contents of Respective Elements (I, K and B) of Polarizer:

Contents of the respective elements were determined from X-ray intensities of circular samples with a diameter of 10 mm measured under the following conditions in X-ray fluorescence analysis, using an analytical curve prepared with standard samples beforehand.

Analyzer: an X-ray fluorescence analyzer (XRF) "ZSX100e" manufactured by RIGAKU INDUSTRIAL CORP.
Anticathode: rhodium
Analyzing crystal: lithium fluoride
Excitation light energy: 40 kV —90 mA
Quantification method: FP method (3) Method of Measuring Transmittance and Polarization Degree of Polarizing Plate:

The transmittance and polarization degree of a polarizing plate were measured by the aforementioned method using a spectrophotometer ["DOT-3" (product name) manufactured by MURAKAMI COLOR RESEARCH LABORATORY].

(4) Method of Measuring Hardness (H) and Composite Elastic Modulus (Er) (Nanoindentation Technique):

After a small cut piece of a polarizing plate was buried in resin, it was then frozen with a Cryo Ultramicrotome. Thereafter, it was subjected to ultraprecision cutting and thereby a sample was produced. Using "TriboIndenter" (product name) manufactured by Hysitron, the section of the sample was subjected to single indentation measurement (indenter: Berkovich (with a triangular pyramid shape), and indentation depth: 230 nm to 280 nm). The measurement was carried out three times per sample and then the average value was determined.

(5) Method of Measuring Pencil Hardness:

Using pencils with a different hardness from each other, the pencil scratch value of the cured resin layer surface of the polarizing plate was determined by a test method according to JIS K 5400 (1990 version).

Example 1

One surface of a polyethylene terephthalate film (with a thickness of 75 μm, "Lumirror S27-E" (trade name) manufactured by Toray Industries, Inc.) was coated with a solventless photocurable composition having the composition described below using a bar coater (#16). Thus a coating film was formed. Thereafter, the coating film was irradiated with ultraviolet rays whose wavelength was 365 nm using a high-pressure mercury lamp so that the accumulated light intensity was 300 mJ/cm$^2$, and thereby a 22-μm thick cured resin layer was formed. Thus a first laminate (R1) was produced.

<Solventless Photocurable Composition>

Component (A): 74 parts by weight of acrylic monomer ("KAYARAD DPHA" (trade name) manufactured by NIPON KAYAKU CO., LTD., Mw=578) represented by general formula (II) mentioned above Component (B): 5 parts by weight of polyurethane acrylate ("SHIKOH UV-7600B" (trade name) manufactured by THE NIPPON SYNTHETIC CHEMICAL INDUSTRY CO., LTD.)

Component (C): 5 parts by weight of 1-hydroxy cyclohexyl phenyl ketone ("IRGACURE 184" (trade name) manufactured by CIBA SPECIALTY CHEMICALS)

Component (D): 21 parts by weight of tetrahydrofurfuryl acrylate (manufactured by WAKO PURE CHEMICAL INDUSTRIES, LTD.)

Next, the surface of the cured resin layer of the first laminate (R1) was coated with an adhesive composition having a composition described below using a bar coater (#3). This was dried in an air circulation drying oven at 100° C. for three minutes, and thereby a 0.7-μm thick adhesive layer was formed. Thus, a second laminate (R2) was obtained.

<Adhesive Composition>

A dilute solution obtained by diluting a one-component moisture-curable polyurethane resin composition (containing urethane resin having a biuret group in the molecular structure thereof, "MT-OLESTER NM89-50G" manufactured by Mitsui Chemicals Polyurethanes, Inc.) with ethyl acetate to double the quantity thereof.

Next, a polymer film (with a thickness of 75 μm, "VF-PS #7500" (trade name) manufactured by KURARAY CO., LTD.) whose main component was polyvinyl alcohol resin was immersed in five baths under the following conditions (1) to (5), while being tensioned in the longitudinal direction thereof. The film was drawn so that the final draw magnification was 6.2 times the original film length. This drawn film was dried for one minute in an air circulation drying oven with a temperature of 40° C. Thus a polarizer with a thickness of 30 μm (with a composite elastic modulus of 10.9 GPa) was prepared. In this polarizer, the contents of the respective elements were as follows: iodine content=3.0% by weight, potassium content=0.6% by weight, and boron content=2.0% by weight.

<Conditions>

(1) Swelling bath: 30° C. pure water (2) Dye bath: 30° C. aqueous solution containing 0.03 part by weight of iodine and 0.2 part by weight of potassium iodide, with respect to 100 parts by weight of water (3) First crosslinking bath: 40° C. aqueous solution containing 3% by weight of potassium iodide and 3% by weight of boric acid (4) Second crosslinking bath: 60° C. aqueous solution containing 5% by weight of potassium iodide and 4% by weight of boric acid (5) Washing bath: 25° C. aqueous solution containing 3% by weight of potassium iodide Subsequently, the second laminate (R2) and the polarizer were stacked together so that the adhesive layer was located on the polarizer side. A 80-μm thick triacetyl cellulose film ("ZRF80S" (trade name) manufactured by Fuji Photo Film Co., Ltd.) was stacked on the polarizer on the opposite side to the side where the second laminate (R2) was provided, with a 0.1-μm thick water-soluble adhesive whose main component was polyvinyl alcohol resin ("GOSEFIMER Z200" (trade name), manufactured by Nippon Synthetic Chemical Industry Co., Ltd.) being interposed therebetween. Thus, a third laminate (R3) was produced.

Subsequently, the polyethylene terephthalate film used as the base material was separated from the third laminate (R3). Thus, a polarizing plate of this example was produced. This polarizing plate had a transmittance by itself of 41.1% and a polarization degree of 99.9%. The cured resin layer of this polarizing plate had a hardness (H) of 541 MPa. The properties of this polarizing plate are indicated in Table 1 below.

TABLE 1

| | Polarizer | | Adhesive layer | | Cured resin layer | | Polarizing plate | |
|---|---|---|---|---|---|---|---|---|
| | Thickness (μm) | Composite elastic modulus (GPa) | Thickness (μm) | Composite elastic modulus (GPa) | Thickness (μm) | Composite elastic modulus (GPa) | Pencil hardness | Crack (*) |
| Ex. 1 | 30 | 10.9 | 0.7 | 0.16 | 22 | 5.5 | 9 H | |
| Ex. 2 | 30 | 10.9 | 2 | 0.16 | 22 | 5.5 | 9 H | |
| Ex. 3 | 30 | | 2 | | 20 | | 9 H | None |
| Ex. 4 | 30 | | 4 | | 20 | | 9 H | None |
| Ex. 5 | 30 | | 8 | | 20 | | 9 H | None |
| Ex. 6 | 30 | | 2 | | 27 | | 9 H | None |
| Ex. 7 | 30 | | 4 | | 27 | | 9 H | None |
| Ex. 8 | 30 | | 8 | | 27 | | 9 H | None |
| Ex. 9 | 30 | | 2 | | 35 | | 9 H | None |
| Ex. 10 | 30 | | 4 | | 35 | | 9 H | None |
| Ex. 11 | 30 | | 8 | | 35 | | 9 H | None |
| Comp. Ex. 1 | 30 | 10.9 | 14 | 0.16 | 22 | 5.5 | 5 H | |
| Comp. Ex. 2 | 30 | 10.9 | 17 | 0.16 | 22 | 5.5 | 4 H | |
| Comp. Ex. 3 | 30 | 10.9 | 23 | — | 22 | 5.5 | H | |
| Comp. Ex. 4 | 30 | | 15 | | 20 | | 6 H | Yes |
| Comp. Ex. 5 | 30 | | 15 | | 27 | | 7 H | Yes |
| Comp. Ex. 6 | 30 | | 15 | | 35 | | 7 H | Yes |

(*) indicating the presence of cracks that can be observed visually at the surface of the cured resin layer

Example 2

A polarizing plate of this example was produced by the same method as in Example 1 except that coating with the adhesive composition was carried out using a bar coater (#10) and thereby a 2-μm thick adhesive layer was formed. The properties of this polarizing plate are indicated in Table 1 above.

Example 3

A polarizing plate of this example was produced by the same method as in Example 1 except that the solventless photocurable composition and adhesive composition having the following compositions were used, the thickness of the cured resin layer was 20 μm, and the thickness of the adhesive layer was 2 μm. The properties of this polarizing plate are indicated in Table 1 above.

<Solventless Photocurable Composition>
Component (A): 12 parts by weight of acrylic monomer represented by structural formula (II) described above ("DPHA" (trade name) manufactured by DAICEL-CYTEC Company, Ltd.)
Component (B): 16 parts by weight of aliphatic urethane acrylate ("PETIA" (trade name) manufactured by DAICEL-CYTEC Company, Ltd.)
Component (C): 24 parts by weight of urethane acrylate ("Shiko UV-7640B" (trade name) manufactured by Nippon Synthetic Chemical Industry Co., Ltd.)
Component (D): 14 parts by weight of methacrylate polymer ("ARONIX M9050" (trade name), Mw=3000, manufactured by TOAGOSEI CO., LTD.)

<Adhesive Composition>
Aqueous polyurethane dispersion ("Superflex 460" (trade name) manufactured by Dai-ichi Kogyo Seiyaku Co., Ltd.)

Example 4

A polarizing plate of this example was produced by the same method as in Example 3 except that coating with the adhesive composition was carried out using a bar coater (#6) and thereby a 4-μm thick adhesive layer was formed. The properties of this polarizing plate are indicated in Table 1 above.

Example 5

A polarizing plate of this example was produced by the same method as in Example 3 except that coating with the adhesive composition was carried out using a bar coater (#10) and thereby a 8-μm thick adhesive layer was formed. The properties of this polarizing plate are indicated in Table 1 above.

Example 6

A polarizing plate of this example was produced by the same method as in Example 3 except that coating with the solventless photocurable composition was carried out using a bar coater (#30) to form a 27-μm thick cured resin layer. The properties of this polarizing plate are indicated in Table 1 above.

Example 7

A polarizing plate of this example was produced by the same method as in Example 3 except that coating with the solventless photocurable composition was carried out using a bar coater (#30) to form a 27-μm thick cured resin layer, and coating with the adhesive composition was carried out using a bar coater (#6) to form a 4-μm thick adhesive layer. The properties of this polarizing plate are indicated in Table 1 above.

Example 8

A polarizing plate of this example was produced by the same method as in Example 3 except that coating with the solventless photocurable composition was carried out using a bar coater (#30) to form a 27-μm thick cured resin layer, and coating with the adhesive composition was carried out using a bar coater (#10) to form a 8-μm thick adhesive layer. The properties of this polarizing plate are indicated in Table 1 above.

Example 9

A polarizing plate of this example was produced by the same method as in Example 3 except that coating with the solventless photocurable composition was carried out using a bar coater (#40) to form a 35-μm thick cured resin layer. The properties of this polarizing plate are indicated in Table 1 above.

Example 10

A polarizing plate of this example was produced by the same method as in Example 3 except that coating with the solventless photocurable composition was carried out using a bar coater (#40) to form a 35-μm thick cured resin layer, and coating with the adhesive composition was carried out using a bar coater (#6) to form a 4-μm thick adhesive layer. The properties of this polarizing plate are indicated in Table 1 above.

Example 11

A polarizing plate of this example was produced by the same method as in Example 3 except that coating with the solventless photocurable composition was carried out using a bar coater (#40) to form a 35-μm thick cured resin layer, and coating with the adhesive composition was carried out using a bar coater (#10) to form a 8-μm thick adhesive layer. The properties of this polarizing plate are indicated in Table 1 above.

Comparative Example 1

A polarizing plate of this comparative example was produced by the same method as in Example 1 except that the one-component moisture-curable polyurethane resin composition was used as the adhesive composition without being diluted, and coating therewith was carried out using a bar coater (#18) to form a 14-μm thick adhesive layer. The properties of this polarizing plate are indicated in Table 1 above.

Comparative Example 2

A polarizing plate of this comparative example was produced by the same method as in Example 1 except that the one-component moisture-curable polyurethane resin composition was used as the adhesive composition without being diluted, and coating therewith was carried out using a bar coater (#20) to form a 17-μm thick adhesive layer. The properties of this polarizing plate are indicated in Table 1 above.

Comparative Example 3

A polarizing plate of this comparative example was produced by the same method as in Example 1 except that instead of the one-component moisture-curable polyurethane resin composition, an acrylic pressure sensitive adhesive composition was used as the adhesive composition. The properties of this polarizing plate are indicated in Table 1 above.

Comparative Example 4

A polarizing plate of this comparative example was produced by the same method as in Example 3 except that coating with the adhesive composition was carried out using a bar coater (#20) and thereby a 15-μm thick adhesive layer was formed. The properties of this polarizing plate are indicated in Table 1 above.

Comparative Example 5

A polarizing plate of this comparative example was produced by the same method as in Example 3 except that coating with the solventless photocurable composition was carried out using a bar coater (#30) to form a 27-μm thick cured resin layer, and coating with the adhesive composition was carried out using a bar coater (#20) to form a 15-μm thick adhesive layer. The properties of this polarizing plate are indicated in Table 1 above.

Comparative Example 6

A polarizing plate of this comparative example was produced by the same method as in Example 3 except that coating with the solventless photocurable composition was carried out using a bar coater (#40) to form a 35-μm thick cured resin layer, and coating with the adhesive composition was carried out using a bar coater (#20) to form a 15-μm thick adhesive layer. The properties of this polarizing plate are indicated in Table 1 above.

<Evaluation>

The polarizing plates described in Examples 1 to 11 each were configured with a cured resin layer formed of a solventless photocurable composition being stacked on a polarizer, with an adhesive layer having a thickness in the range of 0.1 μm to 10 μm being interposed therebetween. These polarizing plates exhibited a far higher surface hardness (pencil hardness: 9H) than that of conventional polarizing plates. On the other hand, the polarizing plates described in Comparative Examples 1 to 6 each were configured with a cured resin layer being stacked on a polarizer with an adhesive layer having a thickness exceeding 10 μm being interposed therebetween. These polarizing plates had considerably lower surface hardness (pencil hardness: H to 7H) than that of the examples. Furthermore, in the polarizing plates described in Examples 3 to 11, no cracks were observed at the surfaces of the cured resin layers. On the other hand, in the polarizing plates described in Comparative Examples 4 to 6, cracks were generated at the surfaces of the cured resin layers.

INDUSTRIAL APPLICABILITY

As described above, the polarizing plate of the present invention has excellent polarization properties, has remarkably higher surface hardness than those of conventional polarizing plates, and can have reduced thickness. Accordingly, the use of the polarizing plate of the present invention is highly effective in preventing scratches during the assembling process or the use of the liquid crystal display while allowing an image display such as a liquid crystal display to have reduced thickness.

The invention claimed is:
1. A polarizing plate comprising a polarizer, an adhesive layer, and a cured resin layer,
   wherein the adhesive layer is stacked on at least one surface of the polarizer,
   the cured resin layer is stacked on a surface of the adhesive layer located on an opposite side to the polarizer,
   the adhesive layer has a thickness in a range of 0.1 μm to 10 μm, and
   the cured resin layer is formed of a solventless photocurable composition containing component (A) and component (B), with component (A) being at least one of a polyfunctional acrylic monomer and a polyfunctional methacrylic monomer and component (B) being a photocurable prepolymer.
2. The polarizing plate according to claim 1, wherein the polarizer has a composite elastic modulus of at least 6 GPa.
3. The polarizing plate according to claim 1, wherein the adhesive layer is a cured layer of a polyurethane resin composition.
4. The polarizing plate according to claim 3, wherein the polyurethane resin composition is a one-component moisture-curable polyurethane resin composition.
5. The polarizing plate according to claim 3, wherein the polyurethane resin composition is an aqueous polyurethane dispersion.
6. The polarizing plate according to claim 1, wherein the cured resin layer has a thickness in a range of 10 μm to 30 μm.
7. The polarizing plate according to claim 1, wherein the polyfunctional acrylic monomer or the polyfunctional methacrylic monomer, component (A), includes in its molecular structure at least four groups selected from an acryloyl group and a methacryloyl group.
8. The polarizing plate according to claim 7, wherein the polyfunctional acrylic monomer and the polyfunctional methacrylic monomer, component (A), are monomers represented by the following general formula (I):

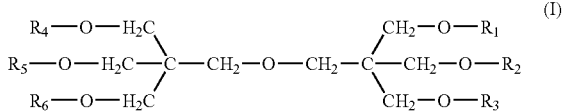

where $R_1$, $R_2$, $R_3$, $R_4$, $R_5$, and $R_6$ each are selected from a hydrogen atom, an acryloyl group, and a methacryloyl group, and at least four of $R_1$, $R_2$, $R_3$, $R_4$, $R_5$, and $R_6$ are selected from an acryloyl group and a methacryloyl group.
9. The polarizing plate according to claim 1, wherein the photocurable prepolymer, component (B), is at least one of polyurethane acrylate and polyurethane methacrylate.
10. The polarizing plate according to claim 1, wherein the solventless photocurable composition comprises the following component (D):
    (D) a reactive diluent.
11. The polarizing plate according to claim 1, wherein the solventless photocurable composition comprises the following component (C):
    (C) a photopolymerization initiator.

12. The polarizing plate according to claim 11, wherein the photopolymerization initiator, component (C), is an acetophenone initiator.

13. The polarizing plate according to claim 1, wherein the polarizer contains iodine and polyvinyl alcohol resin.

14. The polarizing plate according to claim 1, wherein the cured resin layer serves as both a hard-coating layer and a protective layer.

15. An image display comprising a polarizing plate mounted thereon, the polarizing plate is a polarizing plate according to claim 1.

16. A method of manufacturing a polarizing plate according to claim 1, wherein the method comprises the following steps [1] to [6]:

[1] forming a coating film by coating at least one surface of a base material with a solventless photocurable composition containing component (A) and component (B), with component (A) being at least one of a polyfunctional acrylic monomer and a polyfunctional methacrylic monomer and component (B) being a photocurable prepolymer,

[2] irradiating the coating film with at least one of ultraviolet rays and electron rays, so that the coating film is cured to form a cured resin layer and thereby a first laminate (R1) is obtained,

[3] coating a surface of the cured resin layer of the first laminate (R1) with an adhesive composition to form an adhesive layer with a thickness in a range of 0.1 μm to 10 μm and thereby obtaining a second laminate (R2),

[4] providing a polarizer,

[5] stacking the polarizer and the second laminate (R2) together, with the adhesive layer of the second laminate (R2) being located on a side of the polarizer, to obtain a third laminate (R3), and

[6] separating the base material from the third laminate (R3).

* * * * *